United States Patent Office 2,988,454
Patented June 13, 1961

---

2,988,454
MOLD COATING
David C. Aberegg, Columbus, Ohio, assignor to Surface Chemical Development Corporation, Columbus, Ohio, a corporation of Ohio
No Drawing. Filed Aug. 1, 1957, Ser. No. 675,557
11 Claims. (Cl. 106—38.22)

The invention disclosed and claimed in this application relates to compositions of matter and to methods for using them. The invention is illustrated by compositions of matter useful as parting agents or surface coatings for protecting the surface of molds, plungers, and other glass forming parts such as are useful in forming glass articles or the like at high temperatures. I also show methods of using such compositions.

Several practices have been followed in the past for the protection of such molds used in forming glass articles. For example, it has been customary to spray such molds before each forming operation with a lubricant which comprises a mineral oil base carrying a dilute suspension of graphite or the like as a separating agent. Alternatively, the surface of the mold may be plated with a chromium composition from one to several times during each day. Both of these processes are relatively expensive. Suspensions in oil do not give a fine surface finish or prevent oxidation of the mold.

One of the objects of my invention is the provision of a new composition of matter.

A further object of my invention is the provision of a new composition of matter eminently fitted for the coating of molds used in casting or forming materials such as glass and metals.

A further object of my invention is the provision of methods for the applying of mold coating material to molds, plungers, or other forming parts for protection of such forming parts from the action of the molten material being formed, and for the protection from oxidation in the atmosphere.

Further objects and features of my invention should be apparent from the subjoined specification and claims.

I have discovered a new composition of matter comprising a dispersed mixture of sodium silicate (or sodium oxide and silicon dioxide), crystal urea and dispersed graphite and that this composition constitutes a superior coating for protecting molds against the action of a molten material being formed in such molds. It is important for the finest possible finish that the dispersed graphite be in the form of extremely fine particles. I prefer to use a substantially 100% colloidal graphite which is stable to electrolyte and does not coagulate through at least an acid-alkaline range of pH 4.3 to pH 11.3 or higher. The composition which I have discovered is a sprayable composition containing from a trace to about 2% pure graphite by weight. My composition serves as a forming (parting) surface which protects the base metal of the mold or other glass or metal forming parts from corrosive attack including attack from fluorine which is sometimes liberated from glasses and from oxidation and maintains the surface character of the forming part for a relatively long period. The graphite should not exceed an amount equal to the moisture-free weight of the silicate, for best results.

I emphasize again that the character of the dispersed graphite is very important. The graphite must be in very fine particles. The character or fineness of the finish depends on the degree of fineness of the graphite particles. The finer the particles are, the near the finish of the articles formed will be to the original surface finish of the mold. Preferably the graphite should be substantially 100% colloidal. For some uses it is necessary that it be colloidal. It then should be a stable colloid, stable against coagulation and/or precipitation through a range of at least from pH 4.0 to pH 11.3 or higher. Such colloidal graphite may be produced in any known way. It may also be produced by the methods disclosed in my co-pending patent application Serial No. 675,556, filed August 1, 1957. Some types of graphite solutions in water result in coagulation and flocculation of the graphite at pH 11.2 which is the pH of the urea-silicate composition which I produce. Therefore it is necessary that the colloidal graphite be stable at such pH condition.

For less critical cases, the graphite may consist of essentially finely divided particles, not necessarily colloidal but fine enough to remain in suspension a reasonable length of time, for example: I have used 20 grams #30 Dupont sodium silicate, 20 grams urea, 100 grams 2% aqueous emulsion of lecithin, 5 grams silicon dioxide, 7.5 grams 40% graphite suspension (not colloidal but very fine with maximum particle size about 10 microns). This was satisfactory, but did not give as fine a glass finish as my colloidal graphite mixtures. Also less or no graphite adheres to the glass where the graphite is colloidal.

In preparing my compositions I can use either separate alkali oxide such as for example sodium oxide ($Na_2O$) and silicon dioxide or silica ($SiO_2$) and mix the two, or I can use an alkali silicate composition which consists of a preformed mixture of the two. In either case an alkali silicate is formed. In fact, I have at times used a sodium silicate alone, such as for example, #30 Dupont sodium silicate which is a 42.5° Baumé sodium silicate having 38% ($Na_2O + 2.44\ SiO_2$) (i.e. a ratio of $Na_2O$ to $SiO_2$ of 1:2.44). At other times I have used such a sodium silicate with the addition of additional quantities of silica as for example I have mixed 4 parts of #30 Dupont sodium silicate with 1 part of silicon dioxide. I have used considerably higher quantities of silicon dioxide. For example, I have used a ratio by weight of 1 part sodium oxide to about 4.7 parts silicon dioxide with success.

I have discovered that the basic composition described above can be modified so that it withstands higher temperatures and is effective for longer periods of time by the addition of lecithin and silicon dioxide. With the use of lecithin, welding of glass to the coating or lubricant is substantially or entirely eliminated up to 1100° F.

The compositions should be preferably applied to a cleaned metal surface (as for example, cast iron, cast steel or stainless alloy) which has been preferably finally washed as for example with isopropyl alcohol, leaving a clean greaseless surface without char or gum upon heating. The mold should preferably be heated in air to a temperature of 600–625° F. (a bronze-purple color) and cooled, radiating heat to the atmosphere to about 575° F. Thereupon the composition should preferably be applied by spraying, using an air pressure of from 18–20 lbs. with an air-siphon type sprayer held at a distance of from 3 to 6 inches normal to the mold surface and moving at a rate of approximately 1½ to 3 feet/second. Care should be taken that the surface at no time is wetted by the composition. Wetting causes cracks and roughness to occur in the surface. Spraying should not be continued below a temperature of 350° F. and preferably not below 375° F. as danger of wetting is much increased at the lower temperature. Under the conditions specified above, a finally cured coat of the parting agent of from .0005 to .001 inch in thickness will be obtained as measured by a magnetic gauge. It is possible by reheating and respraying to build up a thicker coat. In spraying, surface speed should be determined by the temperature and the heaviness of liquid fed to the sprayer; the higher the temperature, the slower one need move and the heavier the spray may be without wetting. Too heavy a spray results in a rough surface coating.

After coating the surface, the mold may be stored at room temperatures for limited periods of time if kept away from high humidities or if not wet with water. It may be placed in use in such condition. However, best results are obtained, especially in the quality of initial ware formed, if the mold after coating is heated to and held at a temperature of from 975–1050° F. for at least 1¾ hours. A definite change occurs at 1½ hours. It is preferable to heat at above 1000° F. for at least 2 hours.

In the following examples of compositions prepared according to my invention, the dispersed graphite used was prepared according to the disclosure in my said copending application Serial No. 675,556. It contains 5–8% solids including graphite. The graphite is substantially 100% colloidal and is standardized by straight line (linear) light transmission.

*Example I*

I mixed:

11 grams Dupont #30 sodium silicate.
11 grams crystal urea.
5 grams of the colloidal graphite (2% graphite in water).
223 grams water.

This was applied as a coating to a mold used in forming glassware in the following manner: The mold was cleaned carefully and finally washed with isopropyl alcohol and then heated to 625° F. The mold was allowed to cool to 575° F. Thereupon the composition was applied by spraying using air pressure of about 20 lbs. with an air siphon type sprayer held at a distance of about 5 inches and held normal to the mold surface and moved at a rate of about 2 feet per second. The mold was then used in forming glassware. The product obtained was superior in finish. The coating protected the surface of the mold for a greater length of time than any previously used mold coatings known to applicant. The coating was an opalescent gray-black which on heating changed to a lighter color. Hot glass became adherent at about 1000° F. In curing, the temperature should not exceed 850–900° F. It may be used without curing.

*Example II*

I mixed:

25 grams Dupont #30 sodium silicate.
25 grams crystal urea.
65 grams of the colloidal graphite (1½% graphite in water).
335 grams of water.

This was applied as a coating to a glass mold in the same way as described in Example I. The mold was used in forming glass articles with similar results to those described in Example I.

*Example III*

I mixed:

4 grams Dupont #30 sodium silicate.
4 grams crystal urea.
20 grams of the colloidal graphite (1.5% in water).
1 gram colloidal silicon dioxide.
76 grams water.

The finely divided silicon dioxide was added to the urea and silicate in water and dispersed and diluted. Then the dispersed graphite was added. This was applied as a coating to a glass mold in the same way and with similar results to those described in connection with Example I. However, the mold coated with this material could be heated to a temperature of 1150° F. without adherence of glass.

*Example IV*

I added and mixed 5 grams of a 2% aqueous extract of lecithin to 20 grams of the mixture used in Example III. I used this as a mold coating in the same way and achieved similar results to those described in Example I. However, the temperature at which glass adhered was increased as explained in Example III and also the tendency for silica grains or particles to adhere to the glassware was substantially eliminated.

*Example V*

I mixed:

37.5 grams of Dupont #30 sodium silicate.
37.5 grams of crystal urea.
9 grams of colloidal silicon dioxide.
40 grams of 2% aqueous extract of lecithin.
150 grams of the colloidal graphite (1.5% graphite in water).
945 grams of water.

I used this as a mold coating in the same way as in previous examples. The results were the same as observed in Example IV.

*Example VI*

I mixed:

54 grams of 2% aqueous graphite.
25 grams #30 Dupont sodium silicate.
25 grams urea.
4.5 grams silicon dioxide.
25 grams 2% aqueous emulsion of lecithin.
547.5 grams of water.

I used this as a mold coating in the same way as in previous examples. The results were the same as observed in Example IV. In the above example the amount of lecithin on a dry basis is 2% of 25 g. equaling 0.5 gram. On a basis of 25 grams of sodium silicate solution, this is a ratio of 25.0 to 0.5, or 50 to 1, or 6 parts sodium silicate solution to 0.12 part of lecithin.

*Example VII*

I mixed:

10 grams Kasil No. 6 potassium silicate ($K_2O \cdot 2.1SiO_2$—40.75 Baumé).
10 grams urea.
10 grams dispersed colloidal graphite (1% graphite in water).
Sufficient water to make a 250 cc. mixture.

I used this as a mold coating in the same way as in previous examples. The results were similar to those observed in Example I.

*Example VIII*

I mixed:

25 grams urea.
25 grams Dupont #30 sodium silicate.
1.25 grams silicon dioxide.
50 grams 2% aqueous emulsion of lecithin.
10 grams 50% dispersed graphite (finely divided but not colloidal—no particles over approximately 10 microns).

The silicon dioxide was added to the urea and silicate in water and dispersed and diluted. Then the dispersed graphite was added. This product is useful in less critical uses in coating glass forming parts than the products of Examples I–VII inclusive. I sprayed the mixture onto a heated glass forming part surface where it adhered and formed a satisfactory parting surface.

In forming my improved coating I may use any alkali metal silicate or alternatively any alkali metal oxide combined with silicon dioxide. Either sodium silicate (or oxide with silicon) or potassium silicate (or oxide with silica) is useable. However, for economic reasons, I prefer to use sodium silicate (or oxide).

Thus either an alkali metal silicate or a mixture of an alkali metal oxide and silicon dioxide is useable.

In the examples shown, I have used equal parts of urea and alkali silicate solution. However, the amount of urea in proportion to silicate may be varied from about 5 parts urea to 10 parts silicate solution to 20 parts urea to 10 parts silicate solution (or in other words, 3 parts of urea to 6 parts of silicate solution up to 12 parts of urea to 6 parts of silicate solution). Less than 5 parts urea to 10 parts silicate are unsatisfactory.

The addition of larger proportions of $SiO_2$ increases the allowable temperature with which my mold coating or parting agent is useable.

The use of lecithin is valuable where extra silicon dioxide is supplied and improves the characteristics of the mold coating or parting agent. I believe that under heat the lecithin promotes the reaction between the silicate and the excess silicon dioxide.

I may use the dispersed or colloidal graphite in varying proportions. The parting compound is most satisfactory where I use from about 1 part graphite to 6 parts of sodium silicate (computed on a dry basis). As shown by the above examples, as little as 0.055 (approximately 0.06) parts of graphite on a dry basis to 6 parts of sodium silicate solution is operable. For instance, in Example I, I used 5.0 grams of 2% colloidal graphite to 11 grams of sodium silicate solution which is a proportion of 0.1 to 11 or 0.055 to 6. In Example VIII, I used 10.0 grams of 50% graphite to 25 grams of sodium silicate solution or a proportion of 5.0 to 25.0 or 1.2 to 6.0. Thus I have shown that a range of 0.06 part up to 1.2 parts graphite to approximately 6 parts of sodium silicate solution (Dupont #30) is operable.

In Example III in which I use silicon dioxide as well as 4 g. of sodium silicate solution and 20 g. of 1.5% graphite, I have shown a proportion of 0.3 g. graphite to 4 g. silicate solution.

The proportion of silicon dioxide to alkali silicate solution may be 1 to 4 as shown in Example III (1 g. to 4 g.) and Example V (9 g. to 37.5 g.). It may be a higher proportion as shown in Examples VI (1–6) and VIII (1–20).

As shown by the examples, I may use from 10 parts water to each 1 part of solids up to about 18 parts of water to each 1 part of solids, the proportions being by weight. Thus, in Example I, I used 223 grams of water to each 15.3 grams of solids or a ratio of about 15 to 1. Note in the computation of the above that the sodium silicate solution Dupont #30 is a 38% solution and the amount of solid sodium silicate in Example I is 4.18 grams. In Example II, I used 335 grams of water to about 35.5 grams of solid or a ratio of about 10 to 1. In Example VII I used 250 grams of water to about 13.9 grams of solids or a ratio of about 18 to 1.

Based on the alkali silicate solutions used in Examples I, II, and VII, it may be seen that the ratio of water to silicate solution is 223 to 11 (i.e. about 20 to 1), 335 to 25 (i.e. about 13.4 to 1), and 250 to 10 (i.e. about 25 to 1). These ratios based on 6 parts sodium silicate solution show about 120, 80 and 150 parts of water.

As shown by the examples, I may use a fairly wide range of lecithin to alkali metal silicate solution. Thus in Example VI I used 0.5 gram of lecithin to 25 grams of sodium silicate solution and in Example VIII I used 1 gram of lecithin to 25 grams of sodium silicate solution or a ratio of 1 to 25. The above are ratios of 6 parts of sodium silicate solution to 0.12 and 0.24 part of lecithin.

As stated, the addition of additional quantities of colloidal silicon dioxide enables the coating to withstand much higher temperatures. However, there is some tendency in such cases for the glass being formed to pick up grains of silicon dioxide from the mold. The addition of lecithin substantially prevents this tendency. If lecithin is included in the composition, the surface of the mold should be subjected to a temperature of at least 1000° F. for a time of about 1½ to 3 hours as otherwise the glass surface of the article being formed may appear hazy.

It is to be understood that the above described embodiments of my invention are for the purpose of illustration only and various changes may be made without departing from the spirit and scope of my invention.

I claim:

1. A composition of matter for use as a coating or parting agent for the protection of the surfaces of parts used in the formation of glass articles at temperatures of from 575° F. to 1150° F. consisting essentially of an aqueous dispersion of a mixture of (first) a member selected from the group consisting of alkali metal silicate solutions and mixtures of an alkali metal silicate solution and silicon dioxide in which the ratio of the silicon dioxide to alkali metal silicate solution ranges from 1 to 4 up to 1 to 20; (second) crystal urea; and (third) colloidal graphite dispersed in water in which urea is present in from 5 parts to 20 parts to each 10 parts of the effective alkali metal silicate solution, in which the graphite is present in from about 0.06 part to 1.2 parts to each 6 parts of the effective alkali silicate solution and in which the aqueous dispersion consists of approximately 1 part solids to from 10 to 18 parts of water, all parts being by weight.

2. A composition of matter for use as a coating or parting agent for the protection of the surfaces of parts used in the formation of glass articles at temperatures ranging from 575° F. to 1150° F. consisting essentially of an aqueous dispersion of a mixture of an alkali metal silicate solution, crystal urea and colloidal graphite dispersed in water in which the urea is present in from 5 parts to 20 parts to each 10 parts of alkali metal silicate solution, in which the graphite is present in a range of from 0.06 to 1.2 parts to each 6 parts of the alkali metal silicate solution, and in which the aqueous dispersion consists of approximately 1 part solids and 10 parts water, all parts being by weight.

3. A composition of matter for use as a coating or parting agent for the protection of surface of parts used in the formation of glass articles at temperatures ranging from 575° F. to 1150° F. consisting essentially of an aqueous dispersion of a mixture of an alkali metal silicate solution, silicon dioxide, crystal urea and colloidal graphite dispersed in water, in which the urea is present in from 5 parts to 20 parts to each 10 parts of alkali metal silicate solution, in which the graphite is present in from 0.06 to 1.2 parts to each 6 parts of the alkali metal silicate solution, and in which the aqueous dispersion consists of approximately 1 part solids and 10 parts water all parts being by weight.

4. A composition of matter for use as a coating for protecting the surfaces of parts used in forming glass articles at temperatures ranging from 575° F. to 1150° F. consisting essentially of an aqueous dispersion of a mixture of a sodium silicate having a molar ratio of alkali metal oxide to silica of 1:2.44 and having a concentration of the alkali metal silicate solids of 38%, crystal urea and colloidal graphite dispersed in water in which the crystal urea is present in at least 5 parts of crystal urea and not more than 20 parts of crystal urea to each 10 parts of sodium silicate solution, in which the graphite is present in a range of from 0.06 to 1.2 parts to each 6 parts of the sodium silicate solution, and in which the aqueous dispersion consists of approximately 1 part solids to 10 parts water, all parts being by weight.

5. A composition of matter for use as a lubricating mold coating for protecting the surfaces of parts used in forming glass articles at temperatures ranging from 575° F. to 1150° F. consisting essentially of a mixture of approximately 6 parts sodium silicate solution, from 3 to 12 parts dry crystal urea and from about 0.06 to 1.2 parts on a dry basis of colloidal graphite dispersed in water all dispersed in from about 80 parts to about 150 parts water, all proportions being by weight.

6. A composition of matter according to claim 1 in which the dispersed graphite is a dispersion of 100% colloidal graphite having from 5–8% solids by weight and stable against coagulation in the range of at least from pH 4.0 to pH 11.3.

7. A composition of matter according to claim 1 in which the member selected from the group including alkali metal silicate is a 42.5 Baume solution of sodium silicate.

8. A composition of matter for use as a coating for protecting the surfaces of parts used in the formation of glass articles at temperatures ranging from 575° F. up to 1150° F. consisting essentially of an aqueous dispersion of a mixture of approximately 6 parts sodium silicate solution, from 3 to 12 parts crystal urea, from 0.06 to 1.2 parts colloidal graphite dispersed in water and about 1 part colloidal silicon dioxide and in which the aqueous dispersion consists of approximately 1 part solids to 10 parts of water, all parts being by weight.

9. A composition of matter for use as a coating for protecting the surfaces of parts used in the formation of glass articles at temperatures ranging from 575° F. to 1150° F. consisting essentially of an aqueous dispersion of a mixture of approximately 6 parts sodium silicate solution, from 3 to 12 parts dry crystal urea, 0.06 to 1.2 parts dry colloidal graphite dispersed in water, about 1 part colloidal silicon dioxide and an aqueous extract of lecithin in which the lecithin is present on a dry basis of from 0.12 to 0.24 parts, and in which the aqueous dispersion consists of approximately 1 part solids to 10 parts of water, all parts being by weight.

10. A method of applying a coating for protecting the surface of parts used in forming glass articles at temperatures ranging from about 575° F. up to about 1150° F. comprising cleaning the surface to be coated, heating the surface to a temperature of from 600° to 625° F., cooling to about 575° F., spraying a mixture of sodium oxide, silicon dioxide, crystal urea and colloidal graphite dispersed in water on said surface while allowing the surface to continue to cool to a temperature not below 375° F. in which sprayed mixture the silicon dioxide is present in the range of 1 part silicon dioxide to 4 parts sodium silicate solution up to 1 part silicon dioxide to 20 parts sodium silicate solution, in which the crystal urea is present in at least 5 parts crystal urea and not more than 20 parts crystal urea to each 10 parts of sodium silicate solution, in which the graphite is present in the range of from 0.06 part to 1.2 parts to each 6 parts of sodium silicate solution and in which the aqueous dispersion consists of approximately 1 part solids to from 10 to 18 parts of water, all parts being by weight.

11. A method of applying a coating for protecting the surface of parts used in forming glass articles at temperatures ranging from about 575° F. up to about 1150° F. comprising cleaning the surface to be coated, heating the surface to a temperature of from 600° F. to 625° F., cooling to about 575° F., spraying a mixture of sodium silicate, crystal urea and colloidal graphite dispersed in water on said surface while allowing the surface to continue to cool to a temperature not below 375° F. in which sprayed mixture the crystal urea is present in at least 5 parts of crystal urea and not more than 20 parts of crystal urea to each 10 parts of sodium silicate solution, in which the graphite is present in the range of from 0.06 part to 1.2 parts to each 6 parts of sodium silicate solution, and in which the aqueous dispersion consists of approximately 1 part solid to from 10 to 18 parts of water, all parts being by weight.

References Cited in the file of this patent
UNITED STATES PATENTS

| | | |
|---|---|---|
| 1,990,075 | Horak | Feb. 5, 1935 |
| 2,481,391 | Campbell | Sept. 6, 1949 |
| 2,499,729 | Daussan | Mar. 7, 1950 |
| 2,564,308 | Nagel | Aug. 14, 1951 |
| 2,580,524 | Daussan | Jan. 1, 1952 |
| 2,671,747 | Lander | Mar. 9, 1954 |
| 2,772,177 | Lander | Nov. 27, 1956 |

OTHER REFERENCES

Ind. & Eng. Chem., vol. 33, No. 1, page 22, January 1941.